United States Patent [19]

Uemura et al.

[11] Patent Number: 5,858,229

[45] Date of Patent: Jan. 12, 1999

[54] SPIRAL WOUND TYPE MEMBRANE MODULE

[75] Inventors: Keiji Uemura; Hirotake Shigemi, both of Tokyo, Japan

[73] Assignee: Kurita Water Industries Ltd., Tokyo, Japan

[21] Appl. No.: 895,838

[22] Filed: Jul. 17, 1997

[30] Foreign Application Priority Data

| Jul. 19, 1996 | [JP] | Japan | 8-190869 |
| Aug. 5, 1996 | [JP] | Japan | 8-206020 |
| Sep. 3, 1996 | [JP] | Japan | 8-233238 |
| Apr. 1, 1997 | [JP] | Japan | 9-082780 |

[51] Int. Cl.$^6$ .................................................. B01D 63/10
[52] U.S. Cl. ........................ 210/321.75; 210/321.76; 210/321.84; 210/321.85; 210/493.4; 210/497.1
[58] Field of Search ........................ 55/520; 96/4, 11; 210/321.75, 321.76, 321.84, 321.85, 493.4, 497.1

[56] References Cited

U.S. PATENT DOCUMENTS

| 5,114,582 | 5/1992 | Sandstrom et al. | 210/321.74 |
| 5,128,037 | 7/1992 | Pearl et al. | 210/321.74 |
| 5,147,541 | 9/1992 | McDermott, Jr. et al. | 210/321.74 |
| 5,405,422 | 4/1995 | Ueda et al. | 22/520 |
| 5,580,452 | 12/1996 | Lin | 210/321.74 |
| 5,681,467 | 10/1997 | Solie et al. | 210/493.1 |

Primary Examiner—W. L. Walker
Attorney, Agent, or Firm—Kanesaka & Takeuchi

[57] ABSTRACT

A spiral wound type membrane module is formed by winding membranes onto a shaft by way of outer spacers. An inner spacer is inserted into the membrane. Raw water is fed from one end of a membrane roll into channels between the membranes. The raw water flows in a direction substantially parallel to the axis of the roll and is taken out from the other end of the roll as nonpermeated water. Water permeated through the membranes flows in the membranes spirally in the winding direction and is taken out from the opening formed on the circumference of the roll.

8 Claims, 13 Drawing Sheets

SPIRAL WOUND TYPE MEMBRANE MODULE

BACKGROUND OF THE INVENTION AND RELATED ART STATEMENT

The present invention relates to a spiral wound type membrane module or used in a membrane separation device such as a microfiltration device, an ultrafiltration device, or a reverse osmosis membrane separation device.

A spiral wound type membrane module has membranes which are wound around a water collection pipe.

FIG. 7 shows a conventional spiral wound type membrane module wherein a plurality of envelope-like membranes 2 are wound around a water collection pipe 1 with mesh spacers 3 therebetween to form a roll 5. The pipe 1 is provided with slits or openings communicating between the outside and the inside of the pipe 1.

Each membrane 2 in an envelop shape has an inside which communicates with the inside of the pipe 1. The envelope-like membrane 2 contains an inside spacer 4 therein such as a mesh-like spacer, so that the inside of the membrane 2 constitutes a permeated water channel.

The roll 5 of the membranes 2 is provided with unti-telescopers 6,7 at its both ends and brine seals 8 are fitted around the unti-telescopers 6,7.

Feed water flows from the front end of the roll 5 into each feed water channel between the membranes 2 and further flows in the longitudinal direction of the roll 5. Concentrate water flows out of the rear end of the roll 5. During the water flows in the feed water channels, the water permeates through the membranes 2 and flows into the pipe 1 and is taken out from the end of the pipe 1 as permeated water.

The conventional spiral element described above requires the water collection pipe 1 having large diameter for large amount of water flowing therein, whereby the diameter of the spiral wound type membrane element becomes large.

OBJECT AND SUMMARY OF THE INVENTION

It is an object of the present invention to provide a spiral wound type membrane module having a large membrane area and yet large flux without a water collection pipe.

It is another object of the present invention to provide a spiral wound type membrane module capable of filtering an entire amount of raw water when raw water has small amounts of suspended solids.

It is still another object of the present invention to provide a spiral wound type membrane module in which feed water (nonpermeated water) flows at a high velocity even in the downstream of a feed water channel thereof.

A spiral wound type membrane module of a first aspect of the present invention has a plurality of envelop-like membranes wound about an axis of the module. An inner spacer for forming an inner channel is disposed inside each membrane, and an outer spacer for forming an outer channel is disposed between the membranes. Each membrane is formed in a substantial rectangle having first, second, third, and fourth sides. The first, second and third sides are closed and the fourth side is opened to have an opening. The membranes are wound to form a roll of the membranes in such a manner that each second side parallel to the fourth of the membrane is positioned along the core of the roll and each fourth side is exposed on the outer circumference of the membranes roll.

Raw water is charged for example from one end of the roll of the membranes into the channels between the membranes. The raw water flows in a direction almost parallel to the axis of the roll in the channels, and nonpermeated water is discharged from the other end of the roll.

Water permeated through the membranes flows in the membranes spirally in the winding direction and flows out of the openings formed on the circumference of the roll.

Since the permeated water is taken out from the openings on the circumference of the roll, a water collection pipe used in the conventional spiral module is no longer necessary, and the length of the membrane in the winding direction is increased so as to enlarge the membrane area.

When the raw water has small amounts of suspended solids, the entire amount of raw water can be filtered by feeding the raw water from the openings on the circumference of the roll into the membranes. Water permeated through the membranes flows in the channels between the membranes and is taken out from the end of the roll.

A spiral wound type membrane module of a second aspect of the present invention has a plurality of envelop-like membranes wound about an axis of the module. An inner spacer is disposed inside each membrane, and an outer spacer is disposed between the membranes to form an outer channel. Each membrane is formed in a substantial rectangle having first, second, third, and fourth sides.

The first, second and third sides are closed and the fourth side is opened to have an opening. The membranes are wound to form a roll of membranes in such a manner that each second side parallel to the fourth side is positioned along the core of the roll and the fourth side is exposed on the outer circumference of the roll of the membranes. Each outer channel between the membranes is closed along the second and fourth sides, opened along a part of the third side and closed along the rest of the third side, and opened along the entire of the first side.

Raw water is charged from one end of the roll into the outer channels between the membranes of the module of the second aspect. The raw water flows in a direction almost parallel to the axis of the roll, and nonpermeated water is discharged from the other end of the roll.

Water permeated through the membranes flows in the membranes spirally in the winding direction and flows out of the openings of the membranes on the circumference of the roll.

Since the permeated water is taken out from the openings on the circumference of the roll, a water collection pipe used in the conventional spiral module is no longer necessary, and the length of the membrane in the winding direction is increased so as to enlarge the membrane area.

An outlet of the outer channel is disposed on only a part of the third side of the membrane, in other words the outlet is smaller than that of the first aspect where the outlet is opened fully along the third side. This increases the hydraulic pressure of the raw water within the outer channels, thereby also increasing flux (a rate of the permeated water).

A spiral wound type membrane module of a third aspect of the present invention has a permeated water spacer disposed inside each envelop-like membrane and a feed water spacer disposed between the membranes. Each membrane is formed substantially in a rectangle having first, second, third and fourth sides. The first, second and third sides are closed and the fourth side is opened to form an opening. The membranes are wound around a shaft of the module to form a roll of the membranes in such a manner that the first side perpendicular to the fourth side is in contact with the shaft and the fourth side is exposed on the rear end of the roll of the membranes, and the second side opposite to the fourth side is exposed on the front end of the roll. Feed water channels between the membranes are closed along the first, third and fourth sides. Each feed water channel is divided into a feed route and a concentrate route by a partition extending in a direction almost parallel to the axis of the roll from the front end of the roll to a half way toward the roll so as to keep a constant feed flow and a constant concentrate flow in a channel. The feed approach route and the concentrate return route communicate with each other near the rear end of the roll. The approach route is exposed on one of outer and inner regions of the front end of the roll of the membranes. The return route is exposed on the other region of the front end of the roll.

Raw water is fed from one of the outer and inner regions of the front end of the roll into the approach route. The raw water flows in the approach route so as to keep almost constant flow velocity in the path, and turns its flowing direction to flow in the return route, and nonpermeated water flows out of the other region of the front end of the roll.

Permeated water flows in the membranes in a direction substantially parallel to the axis of the roll and flows out of the opening along the fourth side of the membrane exposing the rear end of the roll.

The water collection pipe used in the conventional spiral wound type membrane module is no longer necessary eighther in the module of the third aspect. The permeated water is free from resistance when flowing from the membranes into the water collection pipe, whereby the permeated water flows smoothly in the membranes.

As the water collection pipe is not employed, the length of the membrane in the winding direction is increased so as to enlarge the membrane area. Even in the membrane having increased length in the winding direction, the permeated water flows therein smoothly with weak flow-resistance to increase flux.

A spiral wound type membrane module of a fourth aspect of the present invention, includes a permeated water spacer for forming permeated water channels disposed inside each envelop-like membrane and a feed water spacer for forming feed water channels disposed between the membranes. Each membrane is formed substantially in a rectangle having first, second, third and fourth sides. The first, second and third sides are closed and the fourth side is partly opened to have an opening and closed at the rest thereof to form a blocked portion. The membranes are wound around a shaft to form a roll of the membranes in such a manner that the first side perpendicular to the fourth side is in contact with the shaft, the fourth side is exposed on the rear end of the roll of membranes, and the second side opposite to the fourth side is exposed on the front end of the roll. Each feed water channel between the membranes is closed along the entire first and third sides.

Raw water enters from the front end of the roll into the feed water channels. The raw water flows in the feed water channels in a direction almost parallel to the axis of the roll of the membranes and nonpermeated water is discarged from outlets of the feed water channels exposing the rear end of the roll.

Water permeated through the membranes flows in the membranes in a direction almost parallel to the axis of the roll and flows out of the opening formed on the rear end of the roll.

Since the permeated water flows in the membranes in the direction almost parallel to the axis of the roll as mentioned above, the water collection pipe used in the conventional spiral wound type membrane module is no longer employed whereby the permeated water flows quite smoothly without flowing resistance when flowing from the membranes into the water collection pipe.

As the water collection pipe is eliminated, the length of the membrane in the winding direction is increased so as to enlarge the membrane area without increasing pressure loss. The permeated water flows smoothly with weak flow-resistance even in the membrane having increased length in the winding direction, and the enlarged area increases flux of the permeated water.

An outlet of each feed water channel is opened only partly at the rear end of the roll so that the flow velocity of feed water (nonpermeated water) at the downstream of the feed water channel becomes higher than that of the conventional one, thereby preventing fouling at the downstream of the feed water channel.

In one embodiment of the fourth aspect of the present invention, the openings along the fourth sides of the membranes are positioned in one of outer and inner regions of the rear end of the roll, and the outlets of the feed water channels are positioned in the other region of the rear end of the roll. A ring member is connected to the rear end of the roll to separate permeated water flowing out of the openings of the membranes from nonpermeated water flowing out of the outlets of the feed water channels.

BRIEF DESCRIPTION OF THE DRAWINGS

FIG. 11b is a sectional view taken along the line 11B—11B of FIG. 11a;

FIG. 11c is a sectional view taken along the line 11C—11C of FIG. 11a;

FIG. 11d is a perspective view showing the structure in the neighborhood of D shown in FIG. 11a;

FIG. 15b is a sectional view taken along the line 15B—15B of FIG. 15a;

FIG. 15c is a sectional view taken along the line 15C—15C of FIG. 15a;

DESCRIPTION OF THE PREFERRED EMBODIMENTS

Figure 1A:
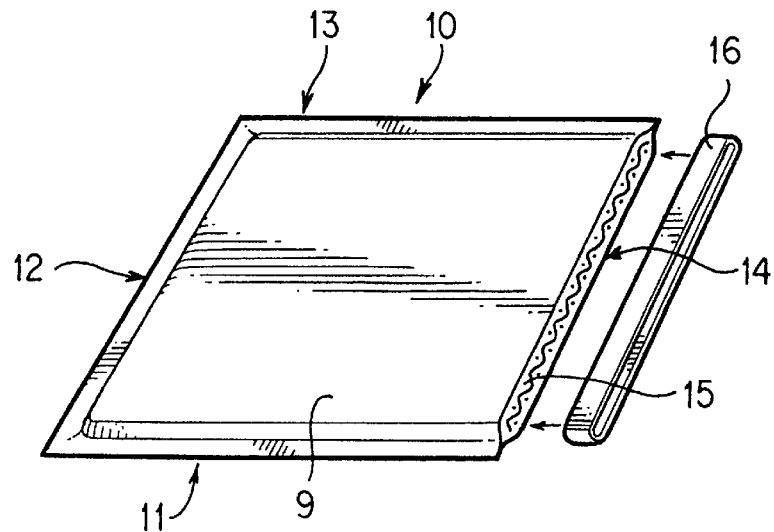
FIG. 1a is a perspective view showing an envelope-like membrane for a spiral wound type membrane module according to a first embodiment.
Figure 1B:
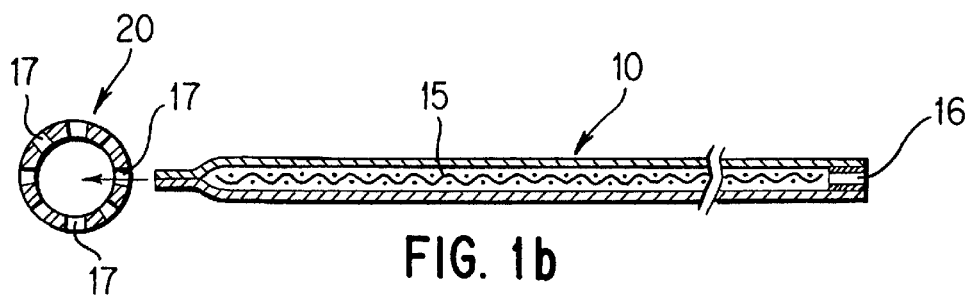
FIG. 1b is a sectional view of the envelope-like membrane and a shaft.
Figure 1C:
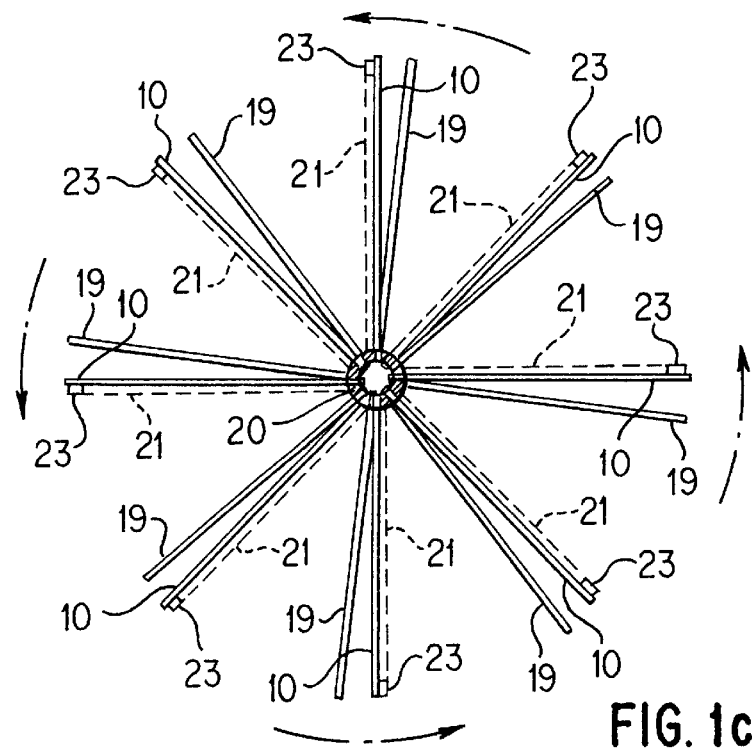
FIG. 1c is a sectional view illustrating a way of wounding the membranes.
Figure 2:
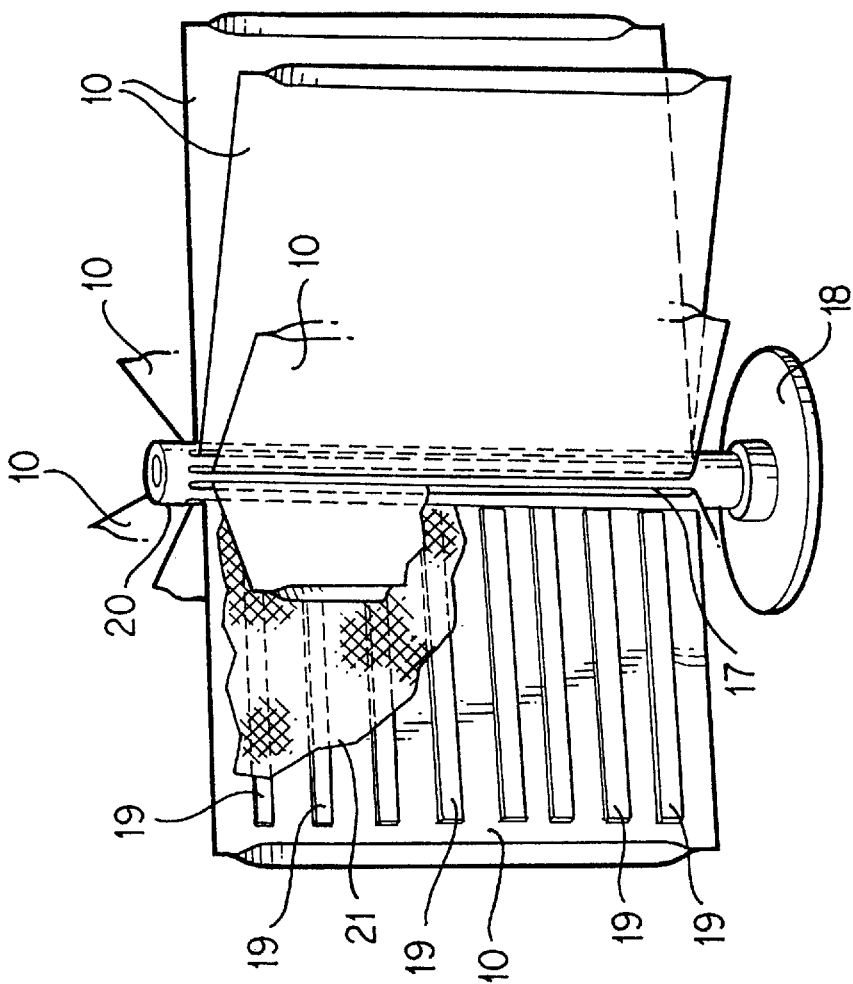
FIG. 2 is a perspective view illustrating the way of winding the membranes.
Figure 4:
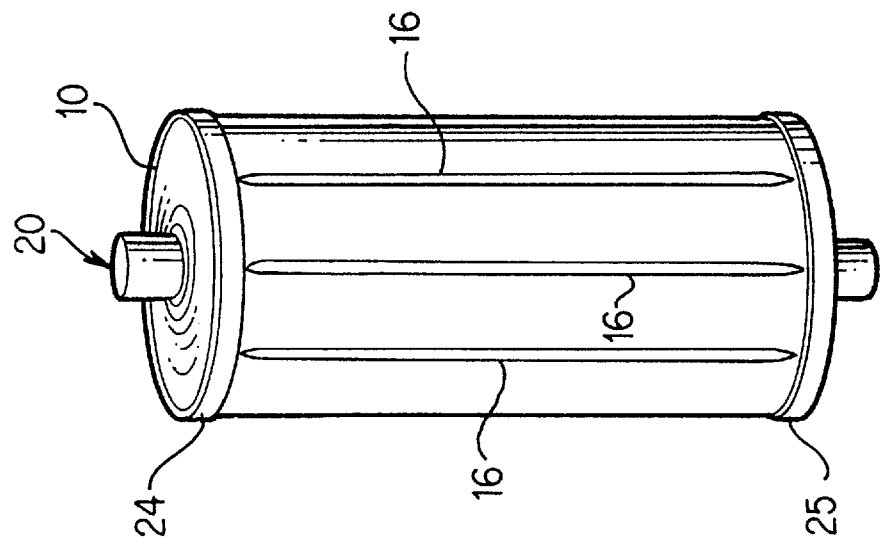
FIG. 4 is a perspective view of the spiral wound type membrane module according to the first embodiment.
Figure 3B:
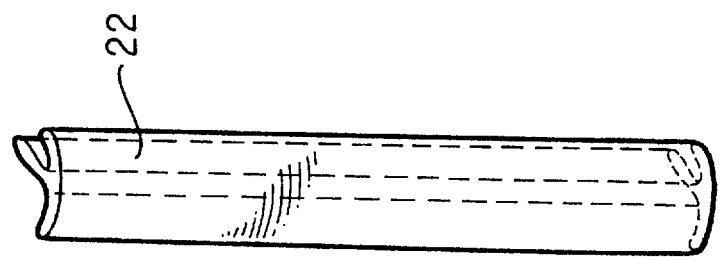
FIG. 3b is a perspective view of a mouth plug.
Figure 3A:
FIG. 3a is a perspective view of a mouth piece.

FIGS. 1a through 6 show a spiral wound type membrane module according to the first embodiment.

The envelope-like membrane 10 is formed in a square or a rectangle having a first side 11, a second side 12, a third side 13, and a fourth side 14. The envelope-like membrane 10 consists of a long sheet of membrane film 9 folded at the second side 12 into two halves which are bonded to each other along the first side 11 and the third side 13 with adhesives and are not bonded to each other to have an opening along the fourth side 14. Instead of a sheet of membrane film which is folded at the second side 12 into two halves, two membrane films may be used which are bonded along the first side 11, the second side 12, and the third side 13 to each other.

Disposed inside the membrane 10 is an inner spacer such as a mesh spacer 15 for forming a channel inside the membrane 10.

A mouth piece 16 is inserted into the opening of the fourth side 14. The membrane film and the mouth piece 16 are bonded to each other at the opening. The membranes 10 are wound around a shaft 20 which consists of a hollow cylinder provided with slits 17 extending in the longitudinal direction of the shaft 20.

After inserting the second side 12 of each membrane 10 into each slit 17, solidifying liquid resin such as epoxy resin is injected into the shaft 20 so that the second side 12 of the membrane 10 is fixed to the shaft 20. The shaft 20 is supported by a support base 18 during the injection of the solidifying liquid resin.

Beams 19 are also fixed to the shaft 20 by inserting one end thereof into the slit 17. The beams 19 are mounted to each slit 17 in such a manner that the beams 19 are spaced apart from each other.

The beams 19 consinsting of synthetic resin are wound around the shaft 20 together with the membranes 10. The beams 19 prevent a roll of the membranes 10 from deforming when the membrane roll is pressed in such a direction reducing the diameter thereof.

After the sides of the membranes 10 and the sides of the beams 19 are fixed to the shaft 20 by solidifying the liquid resin, outer spacers 21 such as mesh spacers for forming a channel between the membranes 10 are put between the membranes 10. The membranes 10, the beams 19 and the outer spacers 21 are then wound around the shaft 20. Mouth plugs 22 are inserted into the mouth pieces 16 to prevent the collapse of the mouth pieces 16.

Before winding then, adhesive 23 is applied to the membranes 10 along the fourth sides 14. Once the adhesive 23 sets after winding the membranes, the channels between the membranes 10 are isolated from outside of the circumference of the roll.

A top ring 24 and an end ring 25 made of synthetic resin are formed at both ends of the outer circumference of the roll and brine seals (not shown) are fitted around the rings 24, 25. The mouth plugs 22 are removed after the rings 24, 25 are formed Raw water (feed water) is fed to the spiral wound type membrane module 26 as shown in FIG. 5 or FIG. 6.

Figure 5:
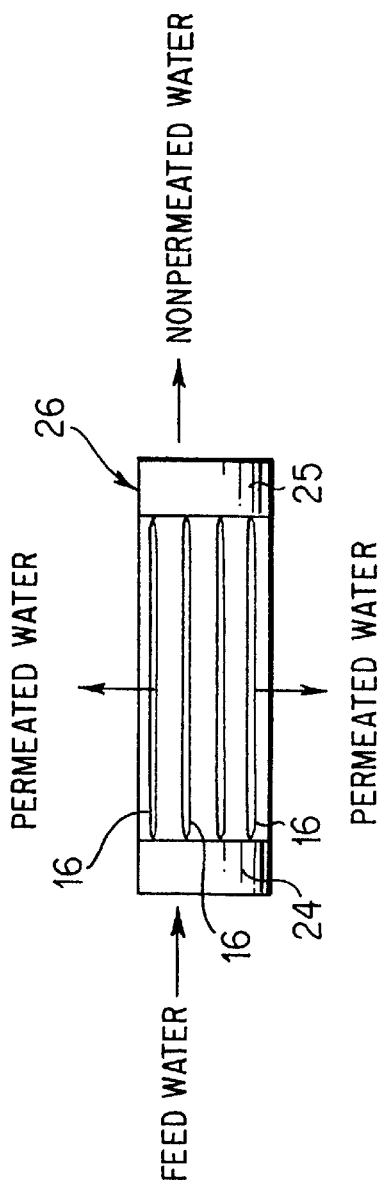
FIG. 5 is a side view illustrating flow of water.

In FIG. 5, feed water flows between the membranes 10 from one end of the module 26 so that nonpermeated water flows out of the other end of the module 26, while permeated water through the membranes 10 is taken out from the mouth pieces 16.

Backwash water (with air, if necessary) is fed from the mouth pieces 16 on the circumference of the module 26 into the membranes 10 so that backwash waste water flows out of the both ends of the module 26.

Figure 6:
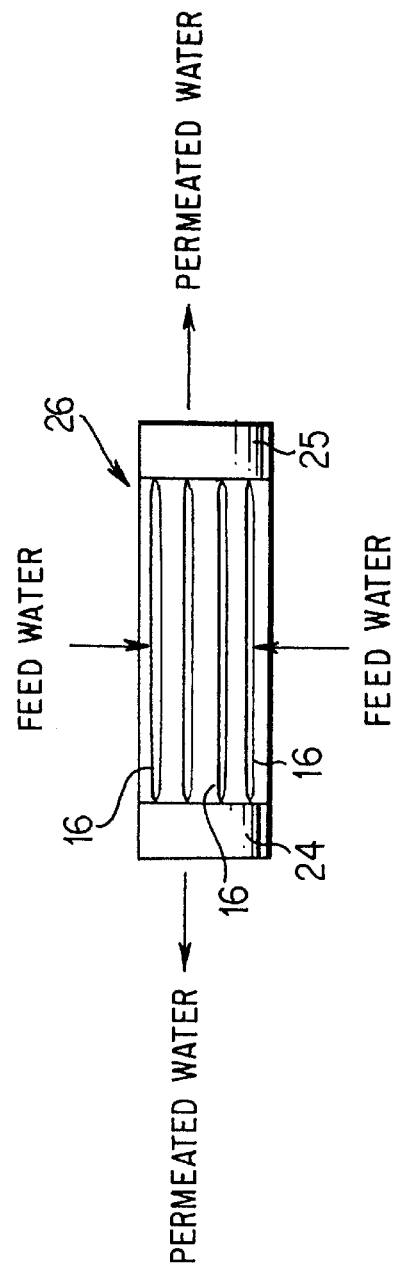
FIG. 6 is a side view illustrating flow of water.
Figure 7:
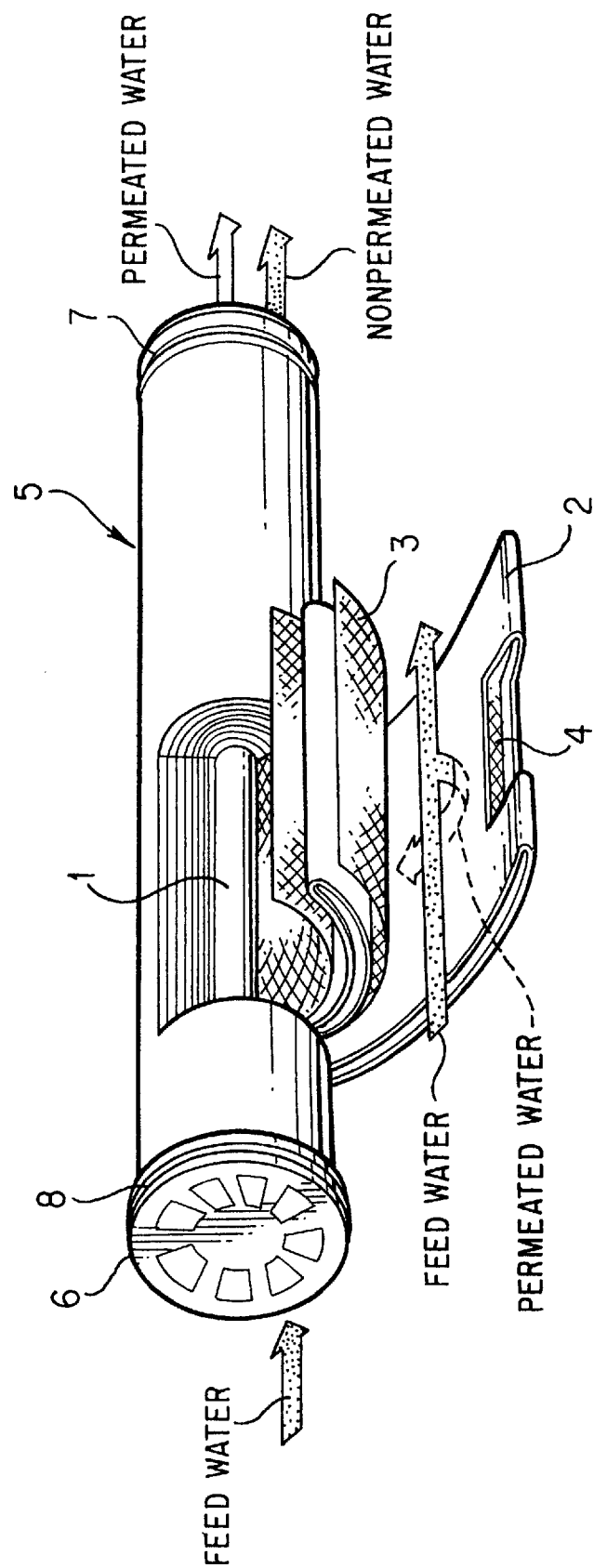
FIG. 7 is a perspective view showing the structure of a conventional spiral wound type membrane module.

In FIG. 6, feed water is charged from the mouth pieces 16 into the membranes 10 and the full flow of raw water is permeated. The permeated water enters between the membranes 10 and flows out of the both ends of the module 26.

Backwash water (with air, if necessary) is fed from the both ends of the module 26 into the spaces between the membranes 10 so that backwash waste water is discharged from the mouth pieces 16.

The spiral wound type membrane module 26 does not employ a water collection pipe, thereby enabling the membrane area to be increased without increasing the diameter of the module. Since the permeated water is taken out from the circumference or ends of the module, the permeated water flows with very low flow-resistance, thereby allowing significantly increased flux of the permeated water. The diameter of the shaft 20 is quite smaller than that of a water collection pipe. It should be noted that while the diameter of a water collection pipe of a conventional spiral wound type membrane module is generally 50–70 mm, the diameter of the shaft 20 of this embodiment is 30 mm or less, particularly 5–30 mm (ex. 25 mm).

As mentioned above, the spiral wound type membrane module 26 of the first embodiment has a large membrane area and yet has a low flowing resistance of the permeated water, so that remarkably great flux of permeated water can be obtained.

Figure 8:
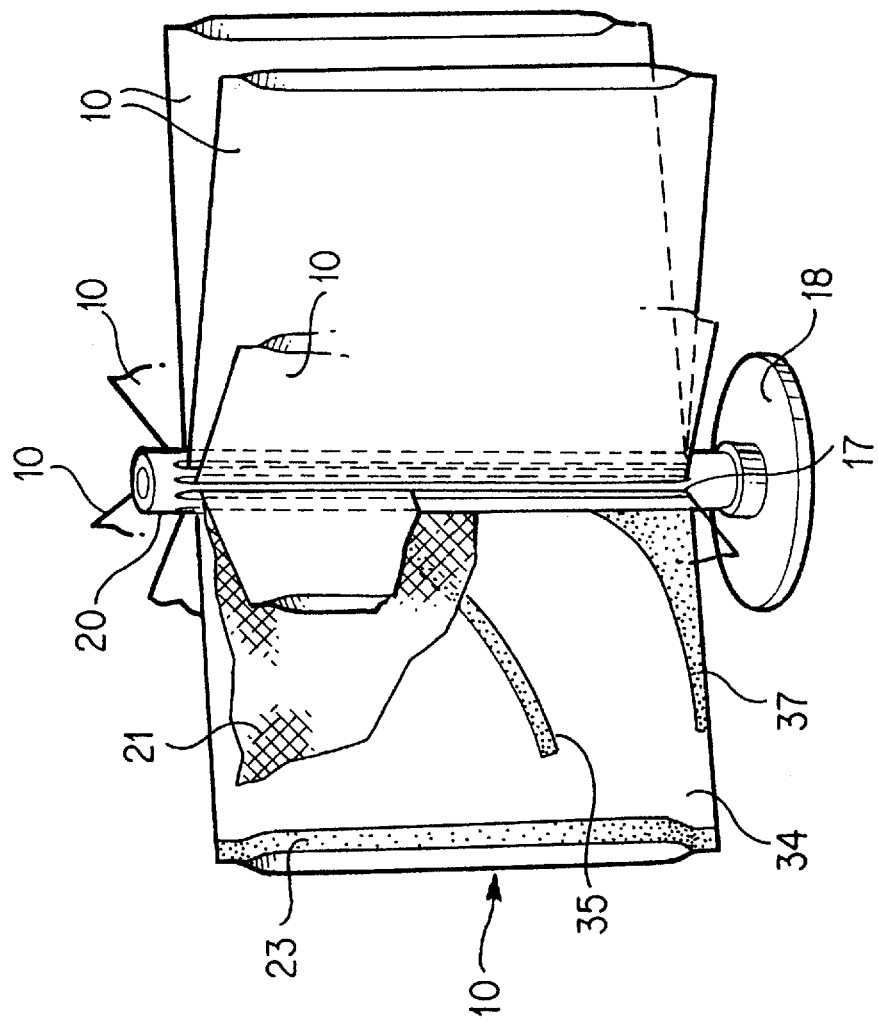
FIG. 8 is a perspective view illustrating a way of winding the membranes according to a second embodiment.
Figure 9:
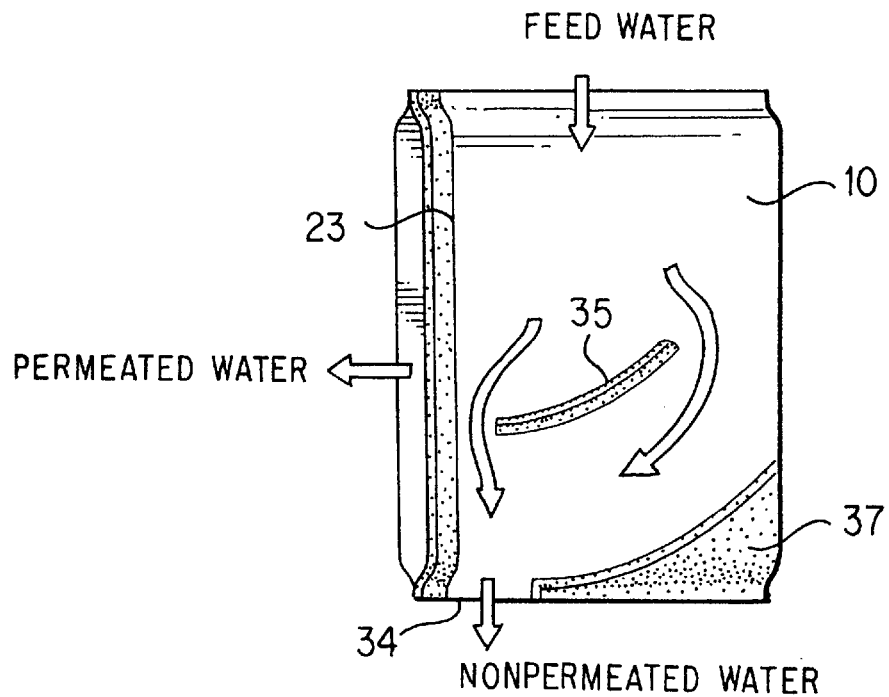
FIG. 9 is a schematic view showing an outer channel in a module according to the second embodiment.
Figure 10:
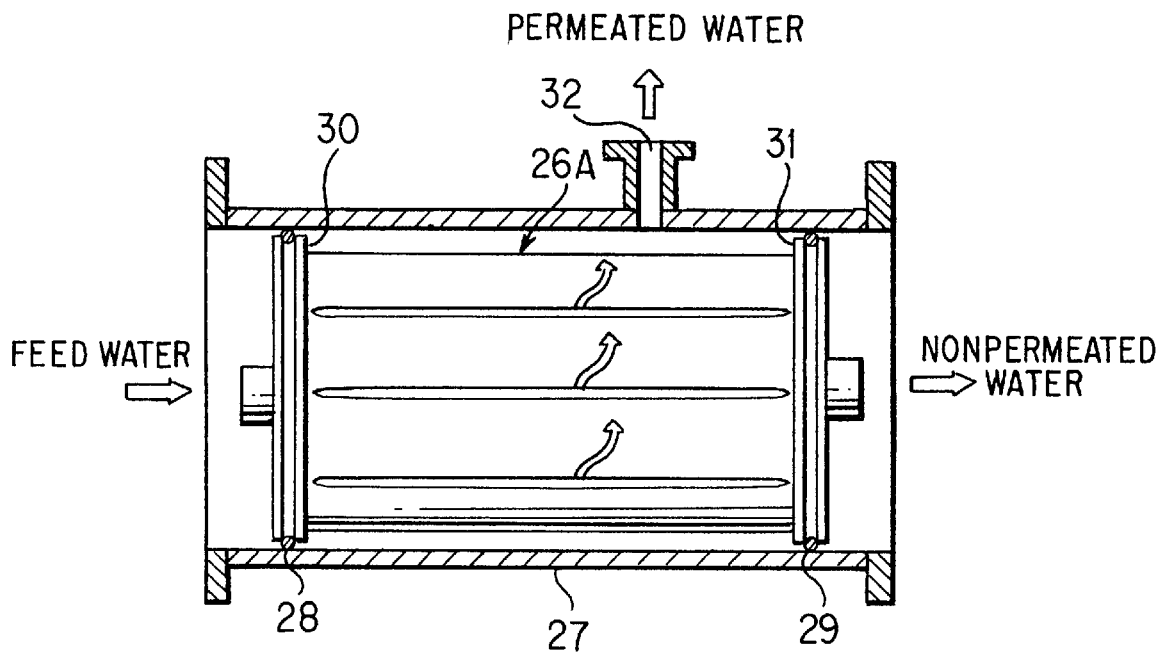
FIG. 10 is a sectional view showing a membrane separation device using the module of the second embodiment.

FIG. 8 is a perspective view illustrating a way of winding the membranes of a spiral wound type membrane module according to a second embodiment of the present invention, FIG. 9 is a schematic view showing an outer channel in the module, FIG. 10 is a sectional view showing a membrane separation device.

The membranes 10 used in the second embodiment are the same as that used in the first embodiment each being formed in a square or rectangle having the first side 11, the second side 12, the third side 13, and the fourth side 14.

The second sides 12 of the membranes 10 are inserted into slits 17 of the hollow shaft 20, and hardening liquid resin such as epoxy resin is fed into the shaft 20 so that the second sides 12 of the membranes 10 are fixed to the shaft 20. The shaft 20 is supported by a support base 18 during hardening the liquid resin.

After the sides of the membranes 10 are fixed to the shaft 20, the outer spacers 21, e.g. mesh spacers, for forming channels between the membranes 10 are put between the membranes 10. The membranes 10 and the outer spacers 21 are wound around the shaft 20. It should be noted that one membrane may be fixed to the shaft, and the other membranes may be bonded to the membrane.

An adhesive 23 is applied to the membranes 10 along the fourth sides 14 for forming brine blocking walls prior to winding the membranes. The adhesive 23 isolates the outer channels between the membranes 10 from the outside of the roll.

An adhesive 37 is applied to the membranes 10 along the third sides 13 for forming constriction walls. The constriction wall of the adhesive 37 extends, along the third side, from the shaft 20 to a half way of the third side toward the forth sides. Once the adhesive 37 sets after winding the membranes 10, the constriction walls are formed so as to provide narrow outlets (brine outlets) 34 for nonpermeated water flowing in the outer channels between the membranes 10.

The narrow brine outlets 34 maintain the feed water in the outer channels at a high hydraulic pressure.

Each constriction wall becomes wider in its width as it comes closer to the shaft 20, which is parallel to the shaft 20. The greater width prevents the raw water from staying in the outer channel in the vicinity of the corner of the constriction wall and the shaft 20.

An adhesive 35 is applied to each membrane 10 at about the center thereof to form a baffle wall. The adhesive 35 is curved along the concave arc-like curve of the constriction wall. Once the adhesive 35 sets after winding the membranes 10, the baffle walls are formed. The baffle walls are spaced apart from the brine blocking wall and the shaft 20.

The baffle walls foster the turbulent flow of the raw water flowing in the outer channels.

After the membranes 10 are wound and the adhesives 37, 23, 35 set, the top ring 30 and the end ring 31 are formed at both ends of the circumference of the roll by synthetic resin molds or the like and seal rings 28, 29 are fitted to the peripheries of the rings 30, 31, respectively.

A spiral wound type membrane module 26A thus constituted is accommodated in a pressure vessel 27 with the seal rings 28, 29 as shown in FIG. 10. The vessel 27 is provided with a port 32 for permeated water.

Feed water is supplied from one end, where the first side of the membrane 10 faces, of the module 26A into the outer channels between the membranes 10 so that nonpermeated water (brine) is taken out from the brine outlets 34 at the other end of the module 26A, while permeated water which permeated through the membranes 10 is taken out from the port 32.

For backwash of the module 26A, backwash water (with air, if necessary) is fed from the mouth pieces 16 on the circumference of the module 26A into the membranes 10 so that backwash waste water are taken out from both ends of the modules 26A.

Similarly to the aforementioned module 26, the nodule 26A also does not use a water collection pipe so that the membrane area is never limited due to the water collection pipe. Since the permeated water is taken out from the circumference of the module, the flowing resistance of the permeated water is reduced, thereby allowing significantly increased flux of permeated water.

Since the brine outlets 34 are narrowed by the constriction walls, the hydraulic pressure of the raw water in the outer channels can be increased. In addition, the baffle walls foster the turbulent flow of the raw water flowing in the outer channels, thereby allowing significantly increased flux of permeated water. The raw water is prevented from staying in the outer channel in the vicinity of the crossing between the constriction wall and the shaft 20, thereby also preventing the clogging of membranes 10 in the vicinity of the constriction wall-shaft crossings.

The brine outlet 34 may be positioned near the shaft 20 and may be positioned in the vicinity of the center of the third edge.

In addition to the effect of the module of the first embodiment, the spiral wound type membrane module according to the second embodiment can further increase the flux of permeated water by fostering the turbulent flow of the raw water flowing in the outer channels.

Figure 11A:
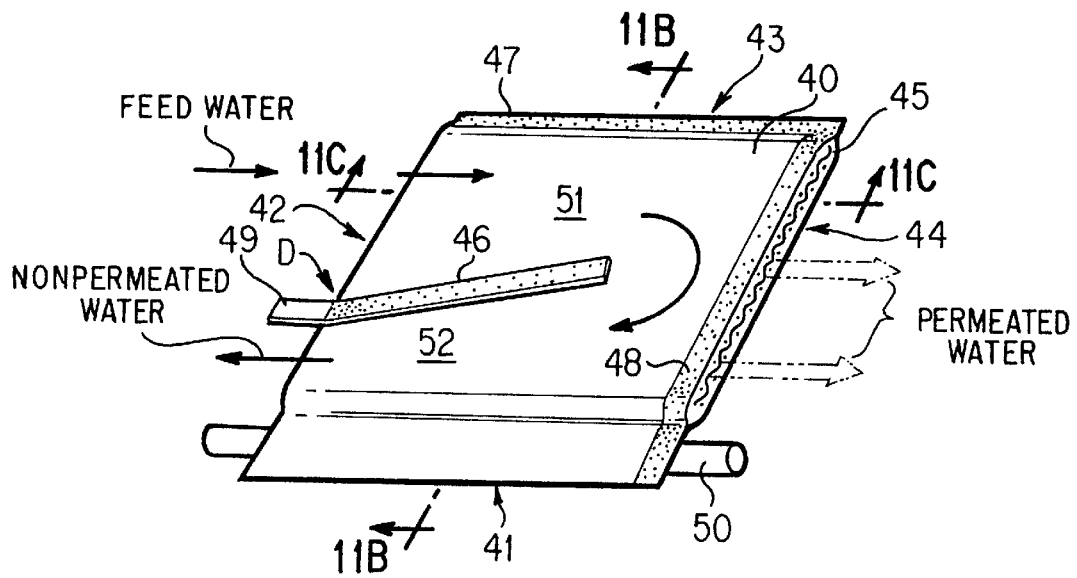
FIG. 11a is a perspective view showing an envelope-like membrane according to a third embodiment.
Figure 11B:
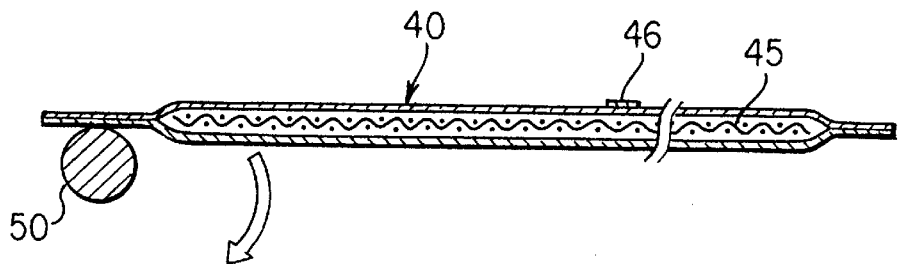
Figure 11C:
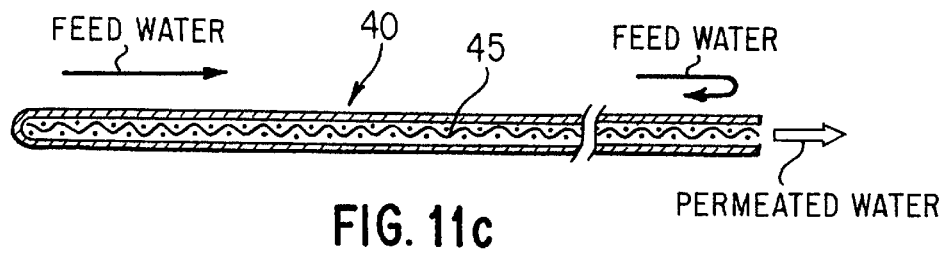
Figure 11D:
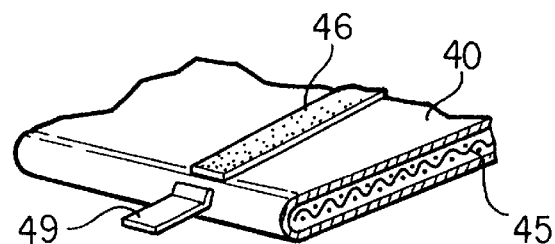
Figure 12:
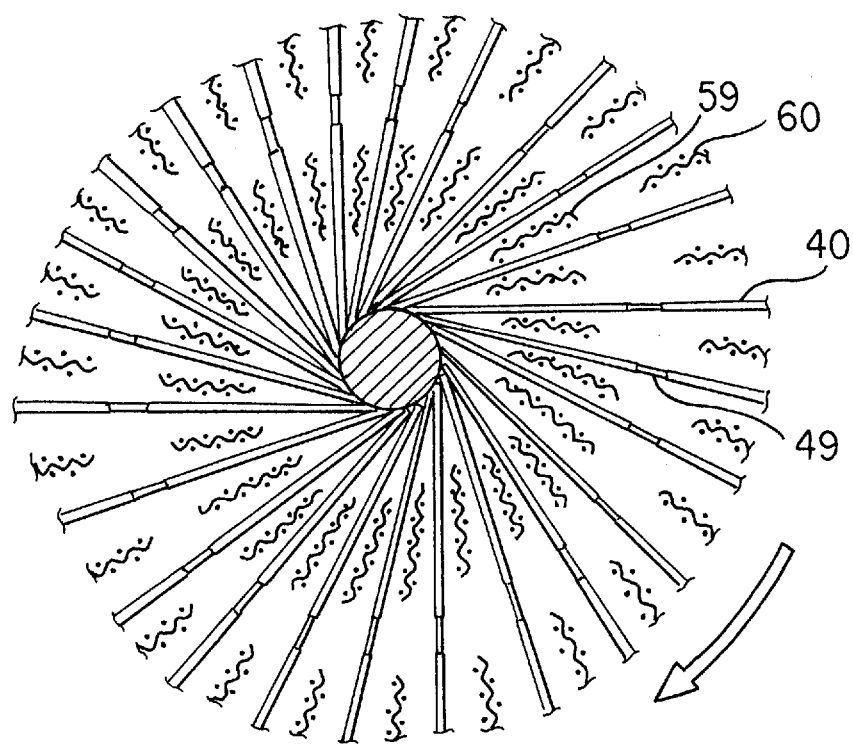
FIG. 12 is a sectional view illustrating a way of winding the envelope-like membranes of the spiral wound type membrane module according to the embodiment.
Figure 13:
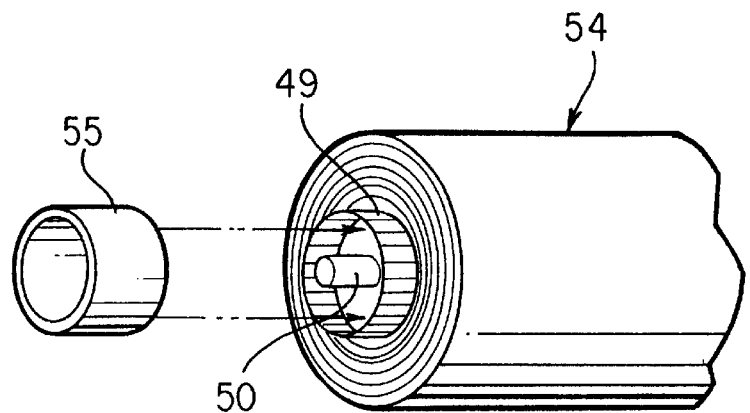
FIG. 13 is a perspective view showing the engagement between the membrane roll and a socket.
Figure 14:
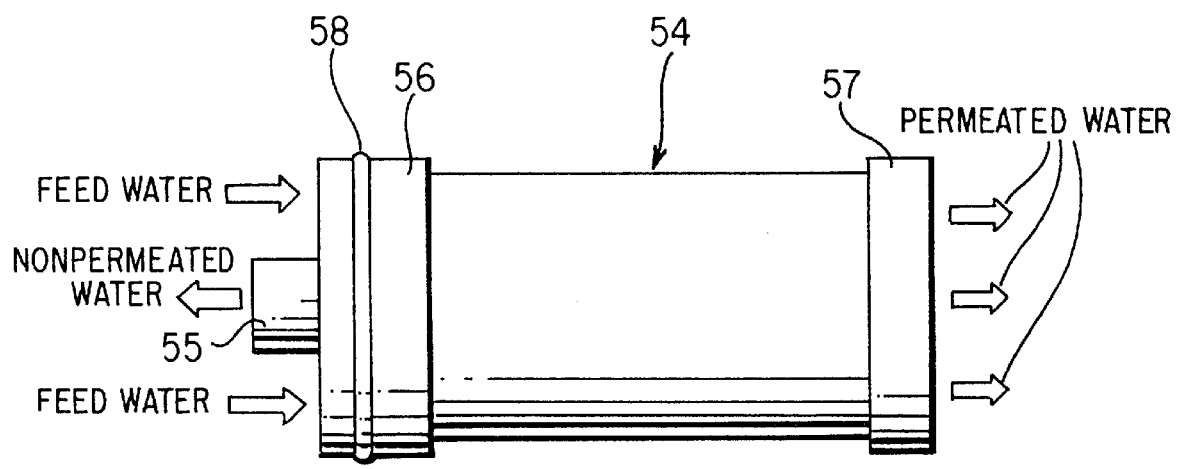
FIG. 14 is a side view of the spiral wound type membrane module according to the third embodiment.

FIG. 11a is a perspective view showing a sheet of envelop-like membrane and a shaft onto which the membrane is wound. FIGS. 11b and 11c are sectional views taken along the line 11B—11B and the line 11C—11C of FIG. 11a, respectively. FIG. 11d is a perspective view showing the structure in the neighborhood of D shown in FIG. 11a. FIG. 12 is a sectional view illustrating a way of winding the membranes onto the shaft. FIG. 13 is a perspective view showing the engagement between the membrane roll and a socket and FIG. 14 is a side view of the spiral wound type membrane module.

The envelope-like membrane 40 is formed in a square or rectangle having a first side 41, a second side 42, a third side 43, and a fourth side 44. The membrane 40 consists of a long sheet of membrane film which is folded at the second side 42 into two halves which are bonded to each other along the first side 41 and the third side 43 with adhesives and are not bonded to each other to have an opening along the fourth side 44 in such a manner as to form an envelope shape. Disposed inside the membrane 40 is an inner spacer (for example, a mesh spacer) 45 for forming channels inside the membrane 40. Instead of a sheet of membrane film which is folded at the second side 42 into two halves, two membrane films may be used. In this case, the membrane films are bonded along the first side 41, the second side 42, and the third side 43 to each other.

Adhesives 46, 47, 48 are applied to one surface of the membrane 40. The membranes 40 are wound around a shaft 50. A front end of the adhesive 46 extends to the half way of the second side 42. The adhesive 46 is applied in a long strip-like form in such a diagonal direction that as the adhesive strip 46 extends from the second side 42, the distance from the first side 41 increases.

The adhesive 47 is applied along the third side 43 and the adhesive 48 is applied along the fourth side 44.

Upon winding a plurality of membranes 40 around the shaft or mandrel 50, the membranes 40 superposed on each other are water tightly bonded to each other at portions where the adhesives 46, 47, 48 are applied. Therefore, a feed water channel, in which the feed water (and nonpermeated water) flows in the order shown by arrows, is formed between the membranes 40, 40. The adhesive 46 sets to form a partition dividing the feed water channel into an approach route 51 and a return route 52.

A fin 49 is disposed to extend forward from a portion of each second side 42 where the end of the adhesive 46 is exposed. The fin 49 may be made of a synthetic resin film or sheet and is preferably bonded to the membrane 40 with adhesives.

The membranes 40 are wound around the shaft 50 so as to form a membrane roll 54 as shown in FIG. 13. The fins 49 project from the front end of the roll 54. The fins 49 are disposed at the same portions on the second sides 42 of the respective membranes 40 in such a manner that the fins 49 are positioned apart from the axis of the roll 44 at the same distance in the radial direction and the fins 49 are partly superposed on each other so as to constitute a ring-like protrusion. A cylindrical socket 55 such as a small cylinder is inserted into the ring-like protrusion at its rear end. The socket 55 and the fins 49 are bonded to each other by an adhesive. The socket 55 may be fitted to the outside of the fins 49.

The socket 55 and the fins 49 are bonded to each other so that, at the front end of the roll 54, an inlet for feed water is formed outside the socket 55 and an outlet for nonpermeated water is formed inside the socket 55.

As shown in FIG. 14, a top ring 56 and an end ring 57 are formed at both ends of the roll 54 by synthetic resin molds or the like and brine seal 58 are fitted to the periphery of the top ring 56.

Before winding the membranes 40 onto the shaft 50, mesh spacers 59, 60 are disposed between the membranes 40 both inside and outside the adhesive 46 as shown in FIG. 12. A feed water channel is formed by disposing the mesh spacers 59, 60 between the membranes 40.

The feed water is supplied into the approach route 51 between the membranes 40 from an area outside the socket 55 on the end face of the roll. The feed water flows in the approach route 51 in the direction almost parallel to the axis of the roll 54, turns around the end of the adhesive 46 (the partition) as shown by the arrow in FIG. 11a, flows in the return route 52 in the direction almost parallel to the axis of the roll 54, and is discharged from the end face inside the socket 55. During the feed water flows in the feed water channels in this manner, the water permeates through the membranes 40 so that the permeated water flows out of the rear end of the roll 54.

In this membrane module, since the permeated water flows in the membranes 40 in the direction parallel to the axis of the roll and is taken out from the rear end, a water collection pipe used in a conventional spiral wound type membrane module is no longer necessary. Therefore, this can avoid the flowing resistance of the water when flowing from the membranes into the water collection pipe, thereby significantly reducing the flowing resistance of the permeated water.

As the water collection pipe can be eliminated, the length of the membrane 40 can be increased in the winding direction so as to increase the membrane area. Even with the membrane having increased length in the winding direction, the flowing resistance of the permeated water is not grown up. This allows greater flux to be obtained.

The approach route 51 and the return route 52 have narrower widths as they go downstream. In this connection, high flow velocity of feed water (nonpermeated water) is obtained even in the downstream of the feed water channel, thereby preventing the adhesion of suspended solids (fouling) in the downstream of the feed water channel.

Since the socket 55 is connected to the roll 54 by using the fins 49, the bond strength between the socket 55 and the roll 54 is high. The inlet for feed water and the outlet for nonpermeated water are water tightly divided from each other by the socket 55.

Though the inlet for feed water is disposed outside the socket 55 and the outlet for nonpermeated water is disposed inside the socket 55 in the module of FIGS. 11 through 14, conversely the inlet for feed water may be disposed inside the socket 55 and the outlet for nonpermeated water may be disposed outside the socket 55. In this case, the adhesive 46 is inclined in a direction opposite to the direction shown in FIG. 11 in such a manner that as the adhesive strip extends from the second side 42, the distance from the first side 41 decreases.

As mentioned above, the spiral wound type membrane module of the third embodiment of the present invention can eliminate the water collection pipe and make the flowing resistance of permeated water smaller. In addition, it can increase the membrane area without increasing the flowing resistance of permeated water.

The third embodiment provides an increase in flow rate of feed water (nonpermeated water) at the downstream of the feed water channel and still prevents the adhesion of suspended solids (fouling) at the downstream of the feed water channel.

Figure 15A:
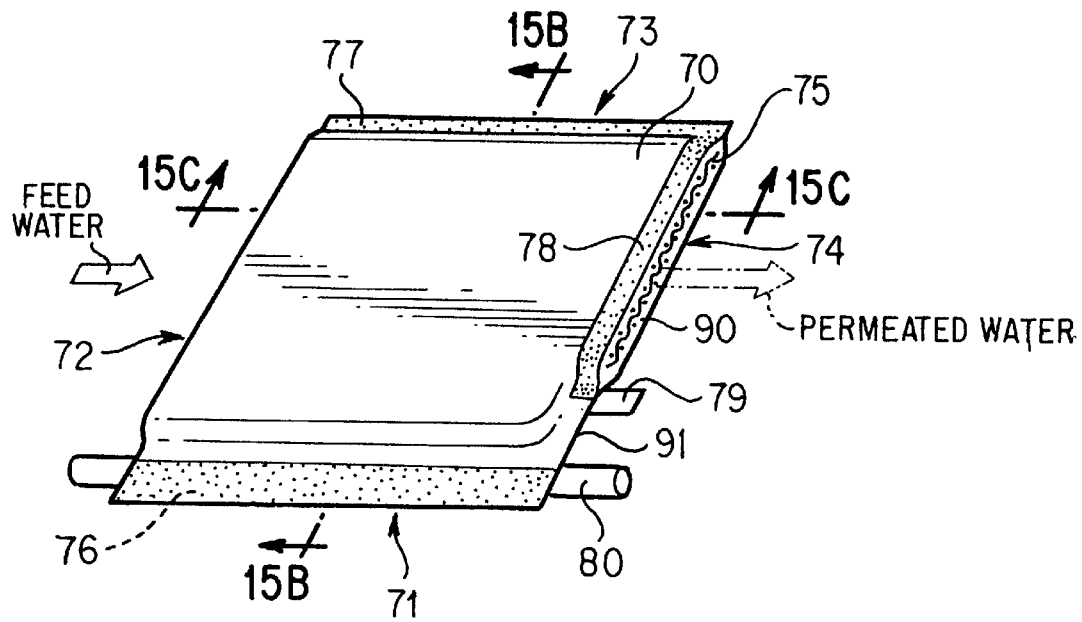
FIG. 15a is a perspective view showing one of envelope-like membranes according to another embodiment.
Figure 15B:
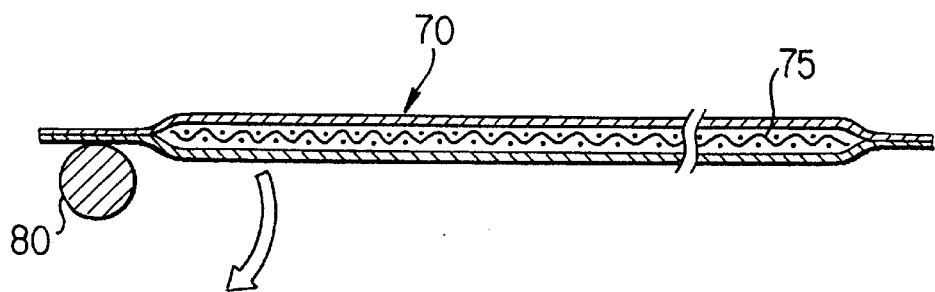
Figure 15C:
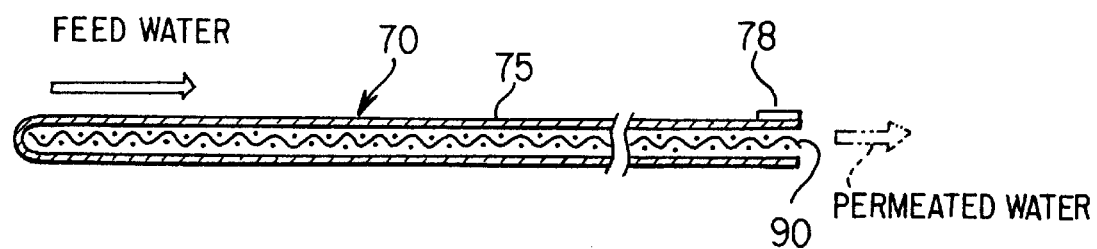
Figure 16:
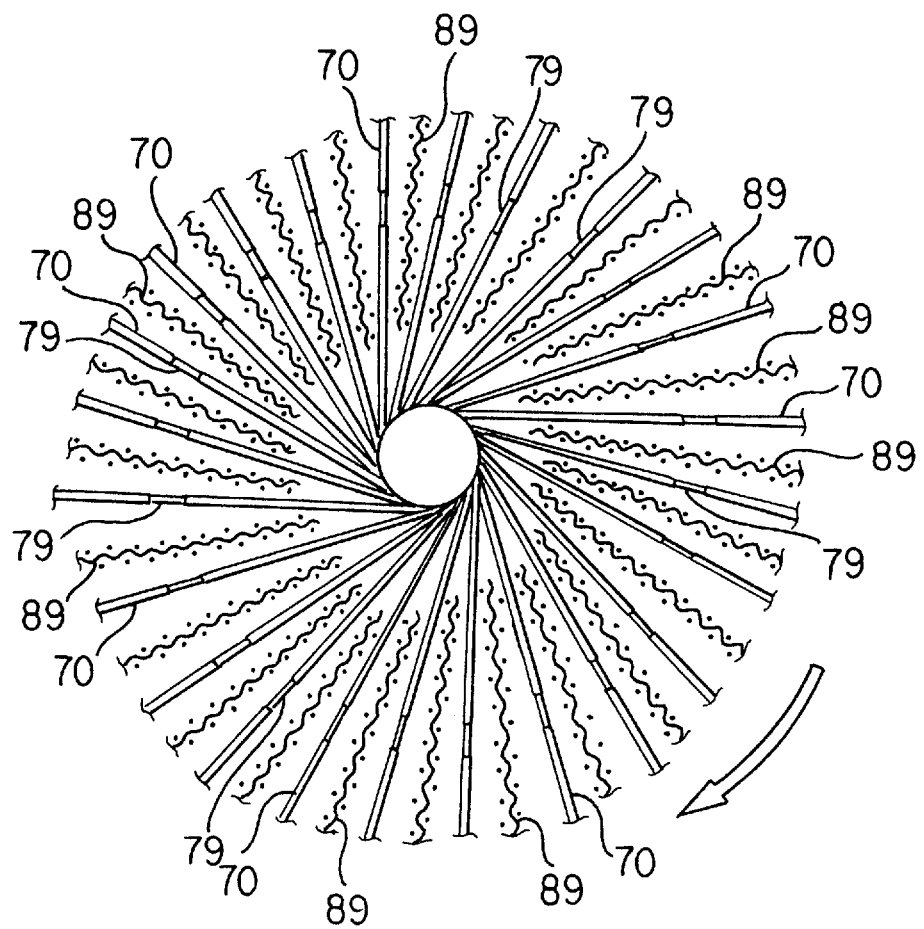
FIG. 16 is a front view illustrating a way of winding the membranes of a spiral wound type membrane module according to the embodiment.
Figure 17:
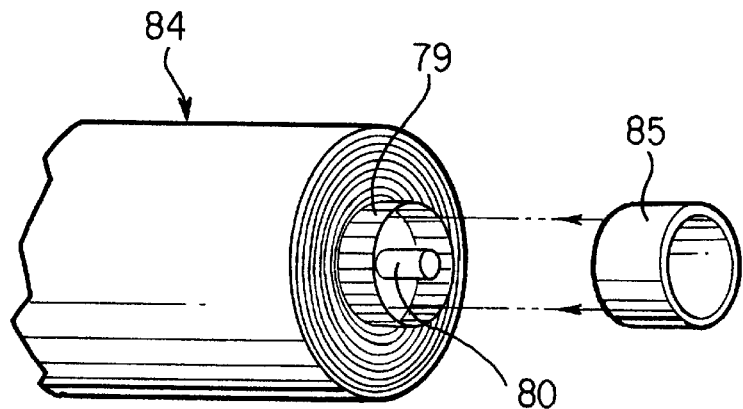
FIG. 17 is a perspective view showing the engagement between the membrane roll and a socket.
Figure 18:
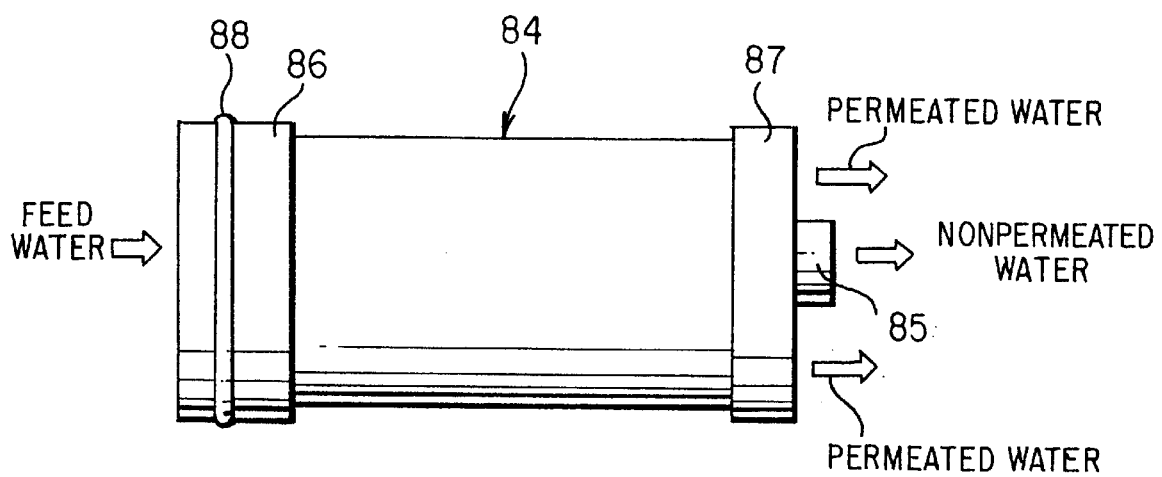
FIG. 18 is a side view of the spiral wound type membrane module according to the embodiment.

FIG. 15a is a perspective view showing an envelope-like membrane and a shaft onto which the membranes are wound, which are used in a spiral wound type membrane module of the fourth embodiment of the present invention. FIGS. 15b and 15c are sectional views taken along the line 15B—15B and the line 15C—15C of FIG. 15a, respectively. FIG. 16 is a sectional view illustrating a way of winding the membranes around the circumference of the shaft, FIG. 17 is a perspective view showing the engagement between the membrane roll and a socket, and FIG. 18 is a side view of the spiral wound type membrane module.

Each envelop-like membrane 70 according to this embodiment is formed in a square or rectangle having a first side 71, a second side 72, a third side 73, and a fourth side 74. The membrane 70 consists of a long sheet of membrane film which is folded at the second side 72 into two halves which are bonded to each other along the first side 71 and the third side 73 with adhesives and are not bonded to each other to have an opening along a part of the fourth side 74 to form an envelope shape.

The halves of the membrane film are not bonded to each other along a part of the fourth side 74 from a halfway of the fourth side 74 to the third side 73 to form an outlet 90 for permeated water. The halves of the membrane film are bonded to each other along the rest of the fourth side 74 from the halfway of the fourth side 74 to the first side 71 so as to form a blocking part 91 for blocking the permeated water.

Disposed inside the membrane 70 is a spacer (for example, a mesh spacer) 75 for forming a channel inside the membrane 70. Instead of a sheet of membrane film 70 which is folded at the second side 72 into two halves, two membrane films may be used. In this case, the membrane films are bonded along the first side 71, the second side 72, the third side 73, and a part of the forth side 74 to each other.

Adhesive 76 is applied to a rear face of the membrane envelope 70 and adhesives 77, 78 are applied to a front face of the membrane 70. The membranes 70 are wound around a shaft 80 to form a membrane roll. The adhesive 76 is applied along the first side 71 and the adhesive 77 is applied along the third side 73. The adhesive 78 is applied from the half way of the fourth side 74 to the third side 73 along the outlet 90 for permeated water.

Upon winding the membranes 70 onto the shaft 80, the membranes 70 superposed on each other are water tightly bonded to each other at portions where the adhesives 76, 77, 78 are applied. Therefore, a feed water channel is formed between the membranes 70. The adhesive 78 forms on the rear end of the membrane roll an outlet 90 for raw water (nonpermeated water) and a blocking part for blocking the flow raw water.

Fins 79 are disposed to extend from a boundary between the outlet 90 for permeated water and the blocking part 91 for blocking the flow of permeated water. The fin 79 may be made of a synthetic resin film or sheet and is preferably bonded to the membrane 70 with adhesives. The roll may be machined so as to be inserted by a socket.

The membranes 70 are wound around the shaft 80 with mesh spacers 89 as shown in FIG. 16 so as to form the membrane roll 84 as shown in FIG. 17. The fins 79 project from the rear end of the membrane roll 84. The fins 79 are disposed on the fourth sides 74 of the respective membranes 70 to constitute a ring-like protrusion. A rear end of a cylindrical socket 85 is inserted into the ring-like protrusion. The socket 85 and the fins 79 are bonded to each other by an adhesive. The socket 85 may be fitted to the outside of the protrusion made by the fins 79. Instead of the fins 79, the roll 84 may be provided with a slit formed at a portion corresponding to the fins 79 and the socket 85 may be embedded into the slit.

The socket 85 and the fins 79 are bonded to each other so that the rear end of the roll 84 is divided into an outlet area for permeated water outside the socket and an outlet area for nonpermeated water inside the socket 85.

Before winding the membranes 70 onto the shaft 80, mesh spacers 89 are disposed between the membranes 70 as shown in FIG. 16 to form the feed water channel.

As shown in FIG. 18, a top ring 86 and an end ring 87 are formed at both ends of the roll 84 by synthetic resin molds or the like and a brine seal 88 is fitted to the periphery of the top ring 86.

The feed water is supplied from the front end of the roll 84 into the feed water channel 81 between the membranes 70, 70 as shown in FIG. 18. The feed water flows in the channel 81 in the direction almost parallel to the axis of the roll 84 and is then taken out from the area inside the socket 85 at the rear end of the roll 84. During the feed water flows in the feed water channels in this manner, the water permeates through the membranes 70 so that the permeated water is taken out from the area outside the socket 85 at the rear end of the roll 84.

In this module, since the permeated water flows through the membranes 70 in the direction parallel to the axis of the roll 84 and is taken out from the rear end, a water collection pipe used in a conventional spiral wound type membrane module is no longer necessary. Therefore, this can avoid the flowing resistance of the water when flowing from the membranes into the water collection pipe, thereby significantly reducing the flowing resistance of the permeated water.

As the water collection pipe can be eliminated, the length of the membrane 70 can be increased in the winding direction so as to increase the membrane area. Even with the membrane having increased length in the winding direction, the flowing resistance of the permeated water is not grown up. This allows greater flux to be obtained.

As the outlet area for raw water is only positioned inside the socket 85, the module has such a structure that the outlet of the feed water channel (i.e. the downstream) is narrowed. Therefore, high flow velocity of the feed water (nonpermeated water) is obtained even in the downstream of the feed water channel, thereby preventing the fouling at the downstream of the feed water channel. The areas inside and outside the socket 85 and the length of the adhesive 78 along the fourth side 74 are preferably decided corresponding to the rate of permeated water collection in this spiral wound type membrane module.

Since the socket 85 is connected to the roll 84 by using the fins 79, the bond strength between the socket 85 and the roll 84 is high. The outlet area for permeated water and the outlet area for nonpermeated water are water tightly divided from each other by the socket 85.

Though the outlet area for permeated water is disposed outside the socket 85 and the outlet area for nonpermeated water is disposed inside the socket 85 in the module of FIGS. 15 through 18, conversely the outlet area for permeated water may be disposed inside the socket 85 and the outlet area for nonpermeated water may be disposed outside the socket 85.

As mentioned above, in the spiral wound type membrane module of the fourth embodiment of the present invention, the water collection pipe is no longer necessary and the flowing resistance of permeated water is small. In addition, it can increase the membrane area without increasing the flowing resistance of permeated water.

The fourth embodiment provides an increase in flow rate of feed water in the downstream of the feed water channel and still prevents the fouling at the downstream of the feed water channel.

What is claimed is:

1. A spiral wound type membrane module comprising:
    membranes wound about an axis of the module, each membrane having a form of an envelop,
    inner spacers for forming inner channels disposed inside the membranes, and
    outer spacers for forming outer channels disposed between the membranes,
    each membrane being formed in a substantial rectangle having first, second, third, and fourth sides,
    the first, second and third sides being closed and the fourth side being opened to have and opening, and
    the membranes being wound to form a membrane roll so that the second sides parallel to the fourth sides are positioned in the center of the roll and the fourth sides are exposed on the outer circumference of the membrane roll.

2. A spiral wound type membrane module as claimed in claim 1, wherein raw water is fed from an end face of the membrane roll into raw water channels between the membranes and permeated water flows out of the openings of the fourth sides of the membranes.

3. A spiral wound type membrane module as claimed in claim 1, wherein raw water is fed from the openings of the fourth sides of the membranes into the membranes and permeated water flows in permeated water channels between the membranes and flows out of an end of the membrane roll.

4. A spiral wound type membrane module as claimed in claim 1, wherein each outer channel between the membranes is closed along the fourth side, opened along a part of the third side and closed along the rest thereof, and opened along the entire of the first side.

5. A spiral wound type membrane module as claimed in claim 4, further comprising baffle walls, for fostering a turbulent flow, connecting the membranes which face each other by way of said outer channel.

6. A spiral wound type membrane module comprising:
    membranes wound about a shaft, each membrane having a form of an envelop,
    permeated water spacers for forming permeated water channels disposed inside the membranes, and
    feed water spacers for forming feed water channels disposed between the membranes, each membrane being formed in a substantial rectangle having first, second, third and fourth sides, the first, second, third sides being closed and the fourth side being opened to have an opening, the membranes being wound to form a membrane roll so that the first sides perpendicular to the fourth sides are in contact with the shaft and the fourth sides are exposed on a rear end of the membrane roll, and the second sides opposite to the fourth sides are exposed on a front end of the membrane roll, the feed water channels between the membranes being closed along the third and fourth sides, the feed water channel being divided into an approach route and a return route by a partition extending from the front end of the membrane roll to a half way toward the axis of the membrane roll in a direction substantially parallel to the axis of the membrane roll, the approach route and the return route communicating with each other at the rear end of the membrane roll, the approach route being exposed on one of outside and inside annular portions of the front end of the membrane roll, and the return route being exposed on the other portion of the front end of the membrane roll.

7. A spiral wound type membrane module comprising:

membranes wound around a shaft, each membrane having a form of an envelop, permeated water spacers for forming permeated water channels disposed inside the membranes, and feed water spacers for forming feed water channels disposed between the membranes, each membrane being formed in a substantial rectangle having first, second, third and fourth sides, the first, second and third sides being closed and the fourth side being partly opened to have an opening and closed at a rest therof to have a blocking portion, the membranes being wound to form a membrane roll so that the first sides perpendicular to the fourth sides are in contact with the shaft and the fourth sides are exposed on a rear end of the membrane roll, and the sides opposite to the fourth sides are exposed on the front end of the membrane roll, the feed water channel between the membranes being entirely closed along the third side, closed to have a blocking portion along a portion of the fourth side corresponding to the opening of the membrane, and opened along a portion of the fourth side corresponding to the blocking portion of the membrane.

8. A spiral wound type membrane module as claimed in claim 7, wherein the openings of the membranes are positioned in one of outer and inner regions of the rear end of the membrane roll and the openings of the feed water channels are positioned in the other region of the rear end of the membrane roll, and a ring member is connected to the rear end of the roll for separating permeated water flowing out of the openings of the membranes and nonpermeated water flowing out of the openings of the feed water channels.

* * * * *